United States Patent [19]
Hitachi et al.

[11] Patent Number: 5,177,960
[45] Date of Patent: Jan. 12, 1993

[54] METAL-MADE CARRIER BODY FOR EXHAUST GAS

[75] Inventors: Yuzo Hitachi; Haruo Serizawa, both of Shizuoka, Japan

[73] Assignee: Usui Kokusai Sangyo Kabushiki Kaisha, Japan

[21] Appl. No.: 782,721

[22] Filed: Oct. 28, 1991

Related U.S. Application Data

[63] Continuation of Ser. No. 448,479, Dec. 11, 1989, abandoned.

[30] Foreign Application Priority Data

Dec. 13, 1988 [JP] Japan .................... 63-312902

[51] Int. Cl.$^5$ .................... F01N 3/28; B01J 21/04
[52] U.S. Cl. .................... 60/299; 422/180; 502/527
[58] Field of Search ............ 60/299; 422/180, 211, 422/222; 502/527, 439

[56] References Cited

U.S. PATENT DOCUMENTS

| | | | |
|---|---|---|---|
| 4,098,722 | 7/1978 | Cairns | 502/527 |
| 4,186,172 | 1/1980 | Scholz | 60/299 |
| 4,647,435 | 3/1987 | Nonnenmann | 502/527 |
| 4,863,895 | 9/1989 | Behr | 502/527 |

FOREIGN PATENT DOCUMENTS 70839  6/1981  Japan .................... 502/527

Primary Examiner—Douglas Hart
Attorney, Agent, or Firm—Lowe, Price, LeBlanc & Becker

[57] ABSTRACT

A metal-made carrier body, for carrying thereon an exhaust gas cleaning catalyst, is in the form of a multilayered composite body composed of at least sheet-like metal band and a corrugated metal band. The corrugated band has ridges and inter-ridge grooves, both in contact with the sheet-like band. The shape of the corrugated band is such that a unit part of the corrugated band between each of the ridges and an individual one of the grooves contiguous thereto is longer than a virtual sine curve.

6 Claims, 1 Drawing Sheet

METAL-MADE CARRIER BODY FOR EXHAUST GAS

This application is a continuation of application Ser. No. 07/448,479, filed Dec. 11, 1989, now abandoned.

BACKGROUND OF THE INVENTION

1. Field of the Invention

This invention relates to a metal-made carrier body, for carrying thereon an exhaust gas cleaning catalyst, which is generally provided as an exhaust gas cleaning means at a midpoint of an exhaust system of an automobile.

More particularly, the invention relates to a metal-made carrier body for carrying thereon an exhaust gas cleaning catalyst, in which the individual components of the carrier body can perform their complete function without separation, breakage or other damage when used even in severe environments.

2. Description of the Related Art

Conventional metal-made carrier bodies of the above sort, which are adapted to carry an exhaust gas cleaning catalyst thereon, include those having a structure formed by laminating at least one sheet-like metal band and at least one corrugated metal band in layers or rolling them together into a multi-layered composite body so as to increase the carrying area per unit volume, namely, so as to increase as much as possible the effective area of contact between exhaust gas and the exhaust gas cleaning catalyst per unit volume and to further reduce the own weight of the metal-made carrier body to a maximum possible extent.

For example, a sheet-like band made from a heat-resistant then sheet of Fe-Cr (iron-chromium) steel having a thickness of 0.1 mm or less and a corrugated band made from another thin metal sheet of the same kind are superposed one over the other to have areas of contact therebetween. They are then rolled together spirally into a multi-layered composite body defining many network-patterned gas flow passages along a central axis thereof for allowing exhaust gas to pass therethrough. The multi-layered composite body is enclosed within a tubular metal casing which has a single-layer structure and opens in opposite ends thereof. The members of the multi-layered composite body, i.e., the sheet-like band and corrugated band are put together into a vibration-proof structure.

Namely, the sheet-like band and corrugated band as well as the metal casing are put together at the areas of contact therebetween by welding as disclosed in Japanese Patent laid-Open Publications Nos. 13462/1979 and 1585/1982, for example, or by brazing as disclosed in Japanese Patent Laid-Open Publications Nos. 4373/1981 and 199574/1986, for example.

However, the metal-made carrier body produced by the above conventional joining means cause the following structural problems.

The metal-made carrier body of this type is used in severe thermal environments and hence requires adequate durability against any breakage, cracking or separation of the members making up the carrier body. In the exhaust system of an automobile, the members of the carrier body are subjected to strains (hereinafter called "thermal strains") due to the large difference between their coefficients of thermal expansion (volume expansion and linear expansion) under the severe cooling and heating cycle of from ±20° C. to 900° C. When their separation begins, these members would be cracked or otherwise broken as vibrations from an internal engine or an automobile body are added. With the conventional construction, such separation and cracking can be prevented only incompletely.

SUMMARY OF THE INVENTION

It is therefore an object of this invention to provide a metal-made carrier body, for carrying thereon an exhaust gas cleaning catalyst, in which the constituent members of the carrier body can be prevented from any separation or cracking.

According to this invention, there is provided a metal-made carrier body for carrying thereon an exhaust gas cleaning catalyst, said carrier body being formed by superposing a sheet-like band made of a thin metal sheet and a corrugated band made from another thin metal sheet one over the other in a contiguous relation into a multi-layered composite body of a spiral or laminate form defining many network-patterned gas flow passages along the central axis thereof, said corrugated band having a plurality of ridges and a plurality of inter-ridge grooves, both in contact with said sheet-like band, said corrugated band having a shape such that a unit part of said corrugated band between each of said ridges and an individual one of said grooves contiguous thereto is longer than a virtually sine curve.

The above and other objects, features and additional advantages of this invention will become manifest to those versed in the art upon making reference to the detailed description and the accompanying drawings in which two preferred structural embodiments incorporating the principle of this invention are shown by way of illustrative example.

DETAILED DESCRIPTION

The principle of this invention is particularly useful when embodied in a metal-made carrier body (hereinafter also called "carrier body") for carrying thereon an exhaust gas cleaning catalyst. The significant features of this invention reside in a unique shape of a corrugated metal band, one of the constituent members of the carrier body, as shown in FIGS. 1, 2, 4 and 5. This invention is not limited to these illustrated embodiments, and each of these embodiments should be regarded as just an example.

Figure 1:
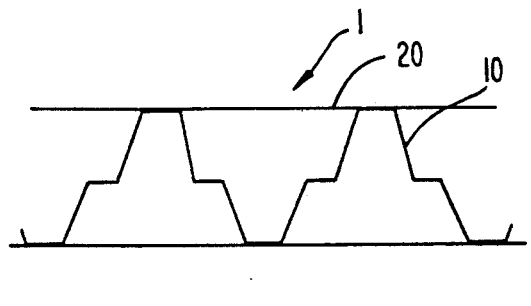
FIG. 1 is a fragmentary detail view of a multi-layered composite body composed of a corrugated metal band of a special shape according to one embodiment of this invention, and a sheet-like metal band.

FIG. 1 shows a portion of a multi-layered composite body 1 in detail which is composed of a corrugated metal band 10 of a special shape according to one embodiment of this invention, and a sheet-like metal band 20.

Figure 2:
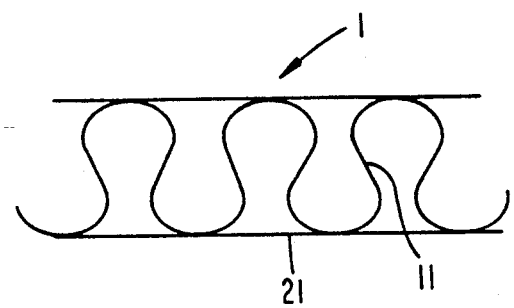
FIG. 2 is a view similar to FIG. 1, showing a corrugated metal band of a different shape according to another embodiment.

FIG. 2 shows a portion of a modified multi-layered composite body 1 in detail which is composed of a modified corrugated metal band 11 of a different shape according to another embodiment, and a sheet-like metal band 21.

Figure 3:
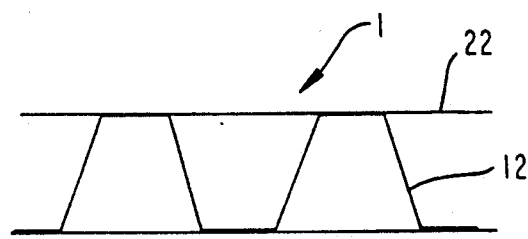
FIG. 3 is a view similar to FIGS. 1 and 2, showing a prior art.

FIG. 3 is a view similar to FIGS. 1 and 2, but showing a prior art multi-layered composite body 1 which is composed of a corrugated metal band 12 and a sheet-like metal band 22.

Figure 4:
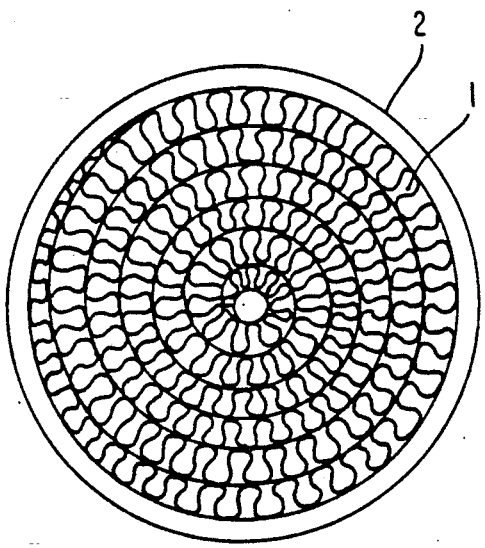
FIG. 4 is a front elevational view of a metal-made carrier body, for carrying thereon an exhaust gas cleaning catalyst, in which the multi-layered composite body of FIG. 2 is incorporated.

FIG. 4 shows a metal-made carrier body, for carrying thereon an exhaust gas cleaning catalyst, which is made up by inserting the multi-layered composite body 1 of FIG. 2 in a tubular metal casing 2 of a circular cross section. In FIG. 2, the multi-layered composite body 1 includes the corrugated metal band 11 of a unique shape, and the sheet-like metal band 21.

Figure 5:
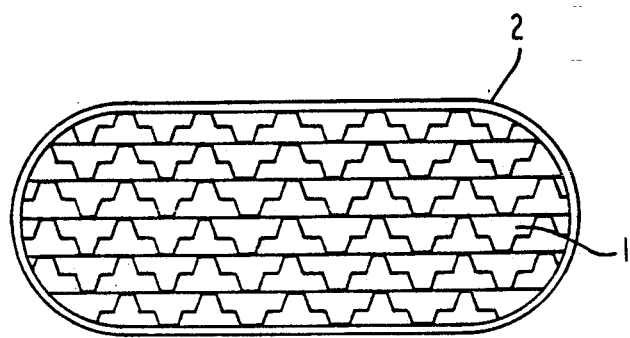
FIG. 5 is a front elevational view of a metal-made carrier body, for carrying thereon an exhaust gas cleaning catalyst, in which the multi-layered composite body of FIG. 1 is incorporated.

FIG. 5 shows another form of the carrier body which is made up by inserting the multi-layered composite body 1 of FIG. 1 in a tubular metal casing 2 of a racing-track-shaped cross section. In FIG. 5, the multi-layered composite body 1 includes the corrugated metal band 10 of a special shape, and the sheet-like metal band 20.

As shown in FIGS. 1 and 2, the shape of the corrugated metal band, one of the constituent members of the multi-layered composite body 1, is remarkably differentiated over the shape of the prior art corrugated metal band (FIG. 3).

One prior art corrugated metal band 12 shown in FIG. 3 is a substantially trapezoidal shape. Though not illustrated here, other known corrugated metal bands have a shape of sine wave in terms of trigonometric function and a shape of meanders having successive mere semicircular curves. For the purpose of comparison with the construction of this invention, these shapes of all the known corrugated metal bands are defined here as a virtually sine curve.

In FIGS. 1 and 2, the corrugated metal band 10, 11 has a plurality of ridges and a plurality of inter-ridge grooves, both in contact with the sheet-like metal band 20, 21.

For the significant feature of this invention, as shown in FIGS. 1 and 2, the corrugated metal band 10, 11 has a unique shape such that the corrugated metal band 10, 11 is longer than the sine wave curve of the prior art corrugated metal band 12 in terms of a unit part of the corrugated metal band between each of the ridges and an individual one of the inter-ridge grooves contiguous thereto.

Specifically, the unit part of the corrugated metal band 10 of FIG. 1 has a single step. The unit part of the corrugated metal band 11 of FIG. 2 has a generally semi-$\Omega$ shape.

Using the corrugated metal band 10, 11 of the special shape mentioned above, the production of a metal-made carrier body for an exhaust gas cleaning catalyst may be performed in the usual manner. For example, the unique-shaped corrugated band 10, 11 and the sheet-like band 20, 21 are superposed one over the other into a multi-layered composite body 1 of a spiral or laminate form defining many network-patterned gal flow passages along the central axis thereof. Then the multi-layered composite body 1 is fitted in a tubular metal casing 2 (container shell)(FIGS. 4 and 5) of a circular or a generally oval (racing-track shape) cross section. Finally, these constituent members of the multi-layered composite body as well as the casing are joined together at their areas of contact by brazing, for example.

Because of the unique shape of the corrugated metal band, the metal-made carrier body can offer an excellent durability even under severe environments. It is thus possible to prevent separation of the constituent members due to thermal strains resulting from their thermal expansion (volume expansion and liner expansion) under the severe cooling and heating cycle of from $-20°$ C. to $900°$ C. It is also possible to prevent cracking or other breakage of the constituent members due to vibrations from the internal engine or the automobile body. This is true because the large stress due to the thermal strains is absorbed by the successive steps of the corrugated band 10 of FIG. 1 as the individual steps are resiliently deformed. In the embodiment of FIG. 2, the corrugated band 11 has a shape of meanders having successive semi-$\Omega$ unit parts each resiliently deformable to absorb the large stress due to the thermal strains.

Although the special shapes of the corrugated band are described in connection with FIGS. 1 and 2, this invention should not limited to these illustrated specific forms without departing from the scope of the appended claims. For example, each of the unit parts of the corrugated band 10 of FIG. 1 may have an optional number of steps, and various modifications and changes to the shape of the individual step may be made. Further, although the tubular metal casing 2 is used as shown in FIGS. 4 and 5, the tubular metal casing is not essential to this invention.

With the metal-made carrier body thus constructed, since the corrugated metal band, one of the constituent members of the carrier body, has a unique wave shape, adequate durability can be achieved when used even under severe conditions, i.e., high temperature of exhaust gas, exothermic reaction between exhaust gas and an exhaust gas cleaning catalyst, and the cooling and heating cycle. In particular, it is possible to effectively prevent the constituent members of the carrier body from any separation, cracking or other breakage due to the stress resulting from the thermal strains in severe using environments.

This invention will now be described more in detail by the following example; however, this invention should not be limited to this example.

EXAMPLE 1

(i) Sheet-like Band:

A heat-resistant steel sheet containing 20% by weight of chromium and 5% by weight of aluminum and having a thickness of 0.05 mm and a width of 70 mm was used as a sheet-like band.

(ii) Corrugated Band:

Another steel sheet of the same kind as the sheet-like band was shaped into a wavy form with ridges having a height of 1.8 mm and spaced at pitches of 3.5 mm.

Then the sheet-like band and the corrugated band were superposed one over the other, whereupon these bands were rolled together into a spiral form to provide a multi-layered composite body. The resulting multi-layered composite body was forcedly inserted in a tubular metal casing of a circular cross section having an inside diameter of about 70 mm. After application of a brazing material, brazing was performed at the areas of contact between the sheet-like and corrugated bands and also between the multi-layered composite body and the metal casing by heat-treatment using a nickel-containing high-temperature brazing material.

Subsequently, slurry in which powder active alumina (gamma-alumina) and alumina sol were blended was applied over the wall surfaces of the exhaust gas flow passages of the carrier body, whereupon a heat-treatment was made over the slurry to 600° C. to form a catalyst carrying layer covering over the wall surfaces of the exhaust gas flow passages. A durability test was conducted to give vibrations to the thus finished carrier body with suddenly cooling and heating in the range of from normal temperature to 800° C. at 50 cycles. The result of the test showed that no separation of the constituent members at their areas of contact or no cracking and breakage of the members was observed, thus proving that this metal-made carrier body was excellent in heat resistance and impact proofness.

What is claimed is:

1. A metal-made carrier body for carrying thereon an exhaust gas cleaning catalyst, said carrier body being formed by superposing a first band made of a thin metal sheet and a second band made from another thin metal sheet one over the other in an adjacent relation into a multi-layered composite body having a form defining many network-patterned gas flow passages along the central axis thereof and such that said second band is disposed between adjacent portions of said first band, wherein each said first band and said second band have an essentially smooth upper and lower surface, said second band further comprising a plurality of units, each unit further comprising a first portion contacting a portion of said first band, a second portion contacting a portion of a said adjacent portion of said first band, a first leg extending between a said first portion and a said second portion, and a second leg extending between a said second portion and a first portion of an adjacent unit, wherein each said first leg and said second leg have a length longer than a virtual sine curve.

2. A metal-made carrier body according to claim 1, wherein said unit of said second band has a generally $\Omega$ shape.

3. A metal-made carrier body according to claim 1, further comprising a tubular metal casing, said multi-layered composite body being inserted in said tubular metal casing.

4. The metal-made carrier body of claim 1 wherein said multi-layered composite body further comprises a spiral form.

5. The metal-made carrier body of claim 1 wherein said multi-layered composite body further comprises a laminate form.

6. A metal-made carrier body according to claim 1, wherein each said first leg and said second leg of said second band has at least one step.

* * * * *